United States Patent
Yang et al.

(10) Patent No.: US 10,335,851 B2
(45) Date of Patent: Jul. 2, 2019

(54) SAND CORE TO ELIMINATE DEGENERATED SKIN

(71) Applicant: GM GLOBAL TECHNOLOGY OPERATIONS LLC, Detroit, MI (US)

(72) Inventors: Jianghuai Yang, Rochester Hills, MI (US); Qigui Wang, Rochester Hills, MI (US); Daniel J Wilson, Linden, MI (US); James D Cremonesi, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/494,774

(22) Filed: Apr. 24, 2017

(65) Prior Publication Data
US 2018/0304346 A1    Oct. 25, 2018

(51) Int. Cl.
*B22C 9/22* (2006.01)
*B22C 3/00* (2006.01)
*B22C 9/02* (2006.01)
*B22C 9/10* (2006.01)
*B22D 25/02* (2006.01)
*B22D 25/06* (2006.01)
*F16C 3/08* (2006.01)

(52) U.S. Cl.
CPC ............. *B22C 9/22* (2013.01); *B22C 3/00* (2013.01); *B22C 9/02* (2013.01); *B22C 9/10* (2013.01); *B22D 25/02* (2013.01); *B22D 25/06* (2013.01); *F16C 3/08* (2013.01); *F16C 2220/02* (2013.01)

(58) Field of Classification Search
CPC .... B22C 3/00; B22C 9/02; B22C 9/10; B22C 9/22; B22D 25/02; B22D 25/06
USPC .............. 164/23, 27, 28, 349, 365, 369
See application file for complete search history.

(56) References Cited

U.S. PATENT DOCUMENTS

| | | | | |
|---|---|---|---|---|
| 2,880,485 | A | * | 4/1959 | Dolza ............... B22C 9/10 164/21 |
| 3,203,057 | A | * | 8/1965 | Hunt et al. ........... B22C 1/02 106/38.3 |

(Continued)

FOREIGN PATENT DOCUMENTS

WO    2007082646 A1    7/2007

OTHER PUBLICATIONS

Abstract of CN 105861930 A, Liu et al., published Aug. 17, 2016.*

(Continued)

*Primary Examiner* — Kevin P Kerns

(57) ABSTRACT

A sand casting apparatus, a method of forming a sand casting apparatus, and an automotive component are provided. The sand casting apparatus includes a sand casting base including a sand mold and/or a sand core having a base sand mixture, where the base sand mixture includes a sand material and a binder material. The sand casting apparatus further includes an outer layer disposed on the sand casting base. The outer layer includes silicon, magnesium, calcium, zirconium, manganese, carbon, aluminum, and iron. The automotive component has portions defining an aperture therein. The automotive component is formed of cast iron and has a nodular graphite structure from interior matrix to surface, where the nodular graphite structure on the surface is formed by a sand core having an outer layer that has reacted with the cast iron automotive component to form the nodular graphite structured surface.

15 Claims, 4 Drawing Sheets

(56) References Cited

U.S. PATENT DOCUMENTS

| | | | | |
|---|---|---|---|---|
| 3,824,113 A | * | 7/1974 | Loxley et al. | B22C 3/00 |
| | | | | 164/72 |
| 5,268,226 A | * | 12/1993 | Sweeney | B28B 1/522 |
| | | | | 248/346.02 |
| 5,582,231 A | | 12/1996 | Siak et al. | |
| 2012/0097354 A1 | | 4/2012 | Kopchick et al. | |
| 2013/0000482 A1 | | 1/2013 | Kopchick et al. | |

OTHER PUBLICATIONS

US Application filed Jul. 18, 2016; U.S. Appl. No: 15/212,905; Applicant: GM Global Technology Dperations LLC; Title: Method of Manufacturing Metal Castings.

* cited by examiner

SAND CORE TO ELIMINATE DEGENERATED SKIN

FIELD

The present disclosure relates to sand casting. More specifically, the present disclosure relates to sand casting for nodular cast iron components.

INTRODUCTION

Current manufacturing processes for producing engine components of a motor vehicle, such as crankshafts, include sand casting. Typically, sand molds and sand cores are created with sand and binders. The sand mold is used to create the casting's external surfaces, and the sand core is used to create the casting's internal surfaces. Sand molds and cores are cured using gases and may or may not include applying heat (hot or cold box) to facilitate curing. Molten metal is poured into the mold and solidified to create the casting.

Nodular iron castings made from sand molds and/or sand cores are susceptible to having a skin surface comprising degenerated graphite accompanied by a ferritic matrix and increased roughness. This degenerated skin condition can deteriorate the casting's strength and fatigue properties and cause failures. The degenerated skin results, at least in part, from interaction of materials from the sand mold and/or the sand core, and the molten metal, and in particular, local magnesium depletion in the cast iron material (typically from sulfur within the sand mold and/or the sand core), moisture from the sand binder resin, decarburization, and metal penetration into the mold.

Current sand molds/cores and coatings have been ineffective to eliminate defects from degenerated skin.

SUMMARY

The present disclosure provides a new outer layer to be applied to a part of a sand mold, which may be a sand core for molding a cavity, such as an aperture or a hollow feature, in a nodular cast iron part. The new outer layer is configured to interact with the molten metal itself to add elements, such as magnesium, to the molten metal and counteract the detrimental effects from the sand mold or core, such as local magnesium depletion due to sulfur. Thus, one or more elements of the outer layer of the mold/core interacts with another element from the mold/core, such as sulfur, and/or one or more elements from the skin of the metal part. This may result in a sound nodular cast iron part that has a smooth surface without degenerated skin.

In one form, which may be combined with or separate from the other forms disclosed herein, a sand casting apparatus, such as a mold package, is provided that includes a sand casting base, which may include a sand mold and/or a sand core. The sand casting base comprises a base sand mixture. The base sand mixture comprises a sand material and a binder material. An outer layer is disposed on the sand casting base, which may be a sand core in some examples. The outer layer comprises silicon, magnesium, calcium, zirconium, manganese, carbon, aluminum, and iron. In addition, the outer layer may include the sand mixture.

In another form, which may be combined with or separate from the other forms disclosed herein, an automotive component is provided that has portions defining an aperture, such as a hollow feature therein. The automotive component is formed of cast iron and has a nodular graphite structure from interior to surface. The nodular graphite structured surface is formed by a sand casting base (a sand mold and/or a sand core) having an outer layer that has reacted with the cast iron molten metal to form the nodular graphite structured surface of the automotive component.

In yet another form, which may be combined with or separate from the other forms disclosed herein, a method of forming a sand casting apparatus is provided. The method includes forming a sand casting base, comprising a sand mold and/or a sand core, from a base sand mixture comprising a sand material and a binder material and forming an outer layer on the sand casting base. The outer layer comprises silicon, magnesium, calcium, zirconium, manganese, carbon, aluminum, and iron. In addition, the outer layer may include the base sand mixture.

Further additional features may be provided, including but not limited to the following: wherein the outer layer comprises about 86 to about 96.5 weight percent of the base sand mixture; wherein the outer layer comprises about 3.5 to about 14 weight percent of a powder material; wherein the powder material comprises about 50 to about 70 weight percent silicon, about 1.2 to about 4.5 weight percent magnesium, about 0.5 to about 1.0 weight percent calcium, about 0.5 to about 1.5 weight percent zirconium, about 0.5 to about 2.5 weight percent manganese, about 2.5 to about 5.0 weight percent carbon, about 0.5 to about 1.0 weight percent aluminum, and at least about 14.485 weight percent iron; wherein the powder material comprises no more than 0.005 weight percent sulfur; wherein the powder material comprises no more than 0.01 weight percent phosphorus; wherein the powder material comprises about 14.485 to about 44.3 weight percent iron; wherein the outer layer is about 3 to about 10 mm thick; a penetration layer disposed between the outer layer and the sand casting base; wherein the outer layer is formed of a slurry comprising a carrier mixture and the powder material; wherein the outer layer is about 0.3 to about 1.0 mm thick; wherein the sand casting base is a sand core; the outer layer being disposed about the circumference of the sand core; the automotive component being a crankshaft having a pin journal defined by the aperture and the hollow feature therein; and wherein the nodular graphite structured surface is formed on an inner surface of the aperture.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles described herein. In the drawings.

DETAILED DESCRIPTION

The following description is merely exemplary in nature and is not intended to limit the present disclosure, application, or uses.

Figure 1:
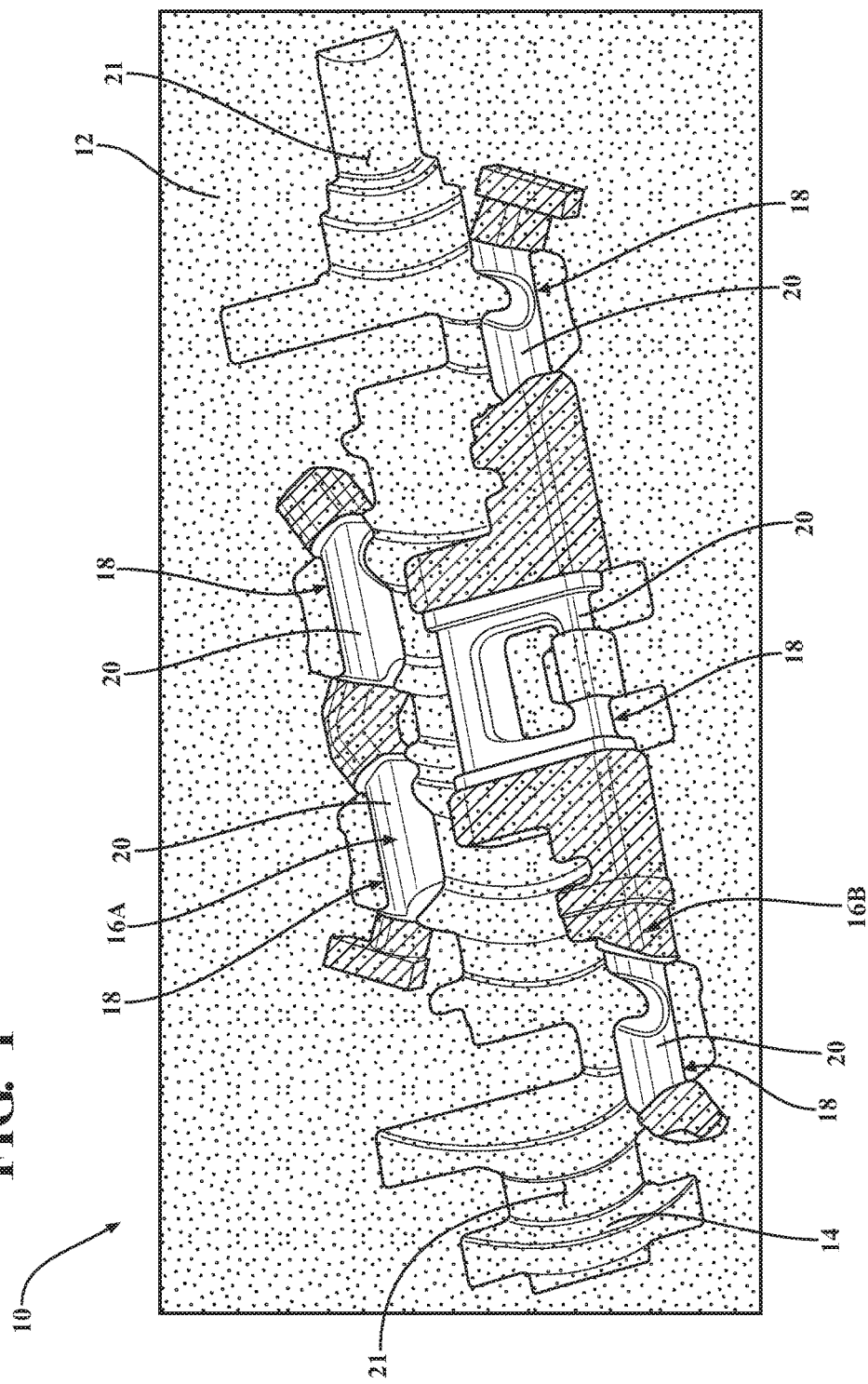
FIG. 1 is a perspective view of a sand casting apparatus, in accordance with the principles of the present disclosure.

Referring now to the drawings, wherein like numerals indicate like or similar elements, FIG. 1 shows a sand casting apparatus generally designated at 10. The sand casting apparatus 10 includes a sand mold half 12, which may be used with hot or cold box sand molding, by way of example. The sand mold half 12 includes a negative or cavity portion 14 for molding an automotive component, such as an engine crankshaft. The sand casting apparatus 10, in this example, further includes two sand cores 16A, 16B for molding apertures and hollow features within the component. The sand mold half 12 and the cores 16A, 16B comprise typical materials for sand mold casting, such as a base sand mixture comprising a sand material and binder materials. The sand material may comprise, for example, a typical sand such as silicon dioxide or any other desired sand material; and the binder material may include any number of known binders, which may differ depending on whether the sand mold apparatus will be used for hot box or cold box sand molding. For example, clay, starch, resin, and/or PTSA may be used as binders.

The sand cores 16A, 16B are formed of the base sand mixture, and in addition, the sand cores 16A, 16B have portions 18 having an outer layer 20 disposed on each of the sand cores 16A, 16B. As will be explained in further detail below, the outer layer 20 comprises silicon, magnesium, calcium, zirconium, manganese, carbon, aluminum, and iron. Either or both of the sand mold half 12 or the sand cores 16A, 16B form a sand casting base onto which the outer layer 20 is disposed. Thus, although the outer layer 20 is shown disposed on only portions 18 of the sand cores 16A, 16B, it should be understood that the outer layer 20 may be disposed on other portions or the entirety of the sand cores 16A, 16B, and/or on portions or the entirety of the sand mold half 12.

Figure 2:
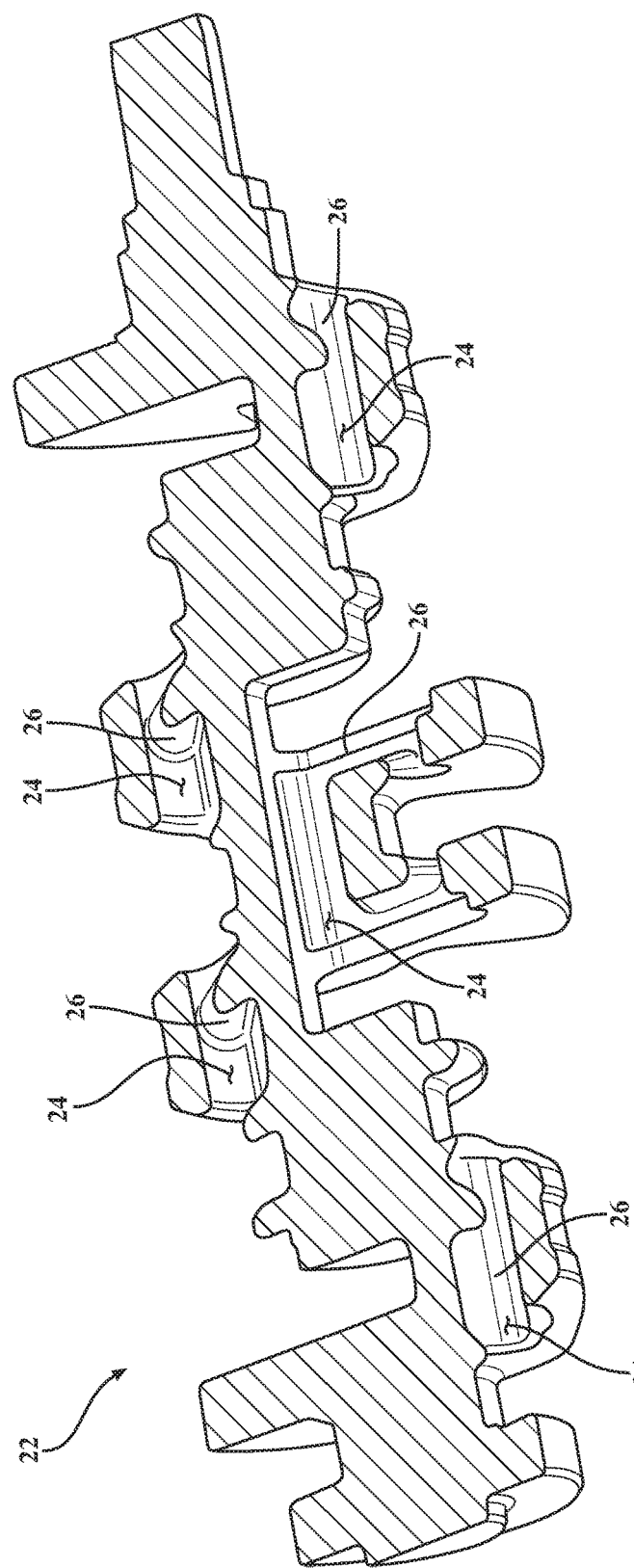
FIG. 2 is a perspective view of an automotive component formed from the sand casting apparatus of FIG. 1, according to the principles of the present disclosure.

Referring now to FIG. 2, a cross-section of an automotive component 22 molded from the sand casting apparatus 10 is illustrated. The automotive component 22 may be formed of nodular cast iron, by way of example. The automotive component 22, in this example, is an engine crankshaft having one or more journals defined by apertures 24 within the crankshaft 22. Typically, the hollow features inside journals defined by the apertures 24 are used to lighten the crankshaft 22. The surfaces 26 of the apertures 24 are formed by the sand cores 16A, 16B. Details about the surfaces 26 will be described in more detail below.

The automotive component 22 is generally formed by pouring molten metal into the sand casting apparatus 10, where the sand mold half 12 will have another complementary half (not shown) to complete the sand casting apparatus 10. The molten metal may be poured through one or more gates and runners to reach the mold half cavity regions 21 throughout the mold halves 12. Hence, as the molten metal flows into the mold halves 12 and around the cores 16A, 16B and fills the cavity regions 21. As the molten metal in the cavity regions 21 solidifies and cools, it forms the automotive component 22.

Figure 3:
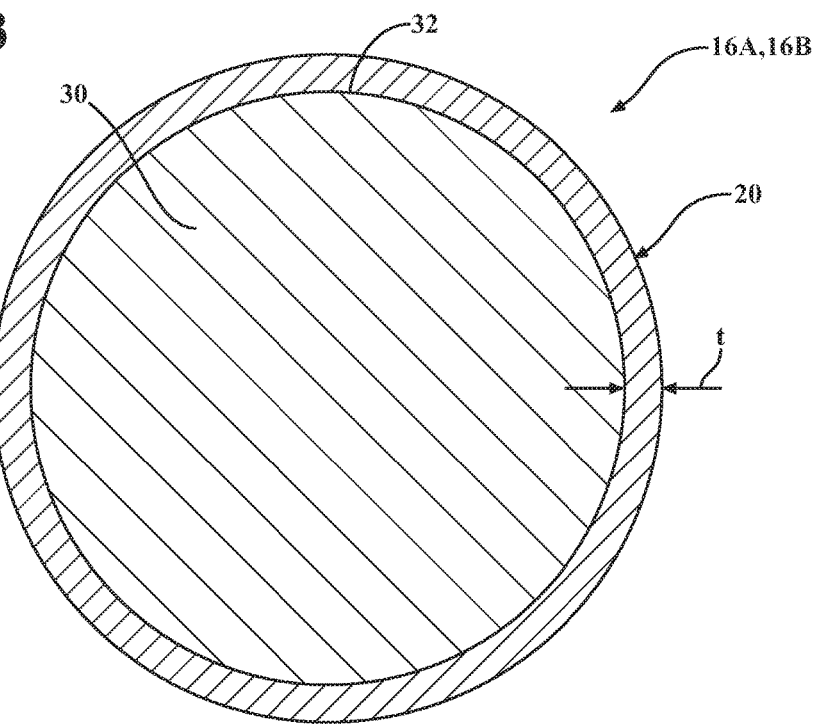
FIG. 3 is a sectional view of one variation of a sand core of the sand casting apparatus of FIG. 1, in accordance with the principles of the present disclosure.

Referring to FIG. 3, the outer layers 20 of the sand cores 16A, 16B are described in greater detail. FIG. 3 shows a first variation of the outer layer 20. The outer layer 20 is disposed on a sand casting base 30, which forms a portion of each of the sand cores 16A, 16B, in this example. As described above, the sand casting base 30 is formed of the base sand mixture, including the sand material and the binder material. The outer layer 20 is formed by creating a new sand mixture that includes a portion of the base sand mixture mixed together with a powder material that is designed to cause a reaction between the outer skin of the automotive component 22 when it is liquid and the outer layer 20 of the sand casting base 30, or in other words, the outer layer 20 of the sand cores 16A, 16B, in this example. To this end, the outer layer 20 may comprise about 86 to about 96.5 weight percent of the base sand mixture, and about 3.5 to about 14 weight percent of the powder material. The powder material may contain silicon, magnesium, calcium, zirconium, manganese, carbon, aluminum, and iron.

In some variations, the powder material may contain specific portions of each of its component elements, as follows: about 50 to about 70 weight percent silicon; about 1.2 to about 4.5 weight percent magnesium; about 0.5 to about 1.0 weight percent calcium; about 0.5 to about 1.5 weight percent zirconium; about 0.5 to about 2.5 weight percent manganese; about 2.5 to about 5.0 weight percent carbon; about 0.5 to about 1.0 weight percent aluminum; and at least about 14.485 weight percent iron. In some forms, the powder material comprises about 14.485 to about 44.3 weight percent iron. Preferably, the powder material contains no more than 0.005 weight percent sulfur and no more than 0.01 weight percent phosphorus.

When the outer layer 20 is formed from a mixture of the base sand mixture and the powder material, the outer layer may preferably have a thickness tin the range of about 3 to about 10 mm. The outer layer 20 may be applied to an outer diameter 32 of the sand casting base 30 during or after hot or cold box core making. The result is a two-layered core 16A, 16B with the outer layer 20 formed on or disposed about the outer diameter 32 of the base 30.

Figure 4:
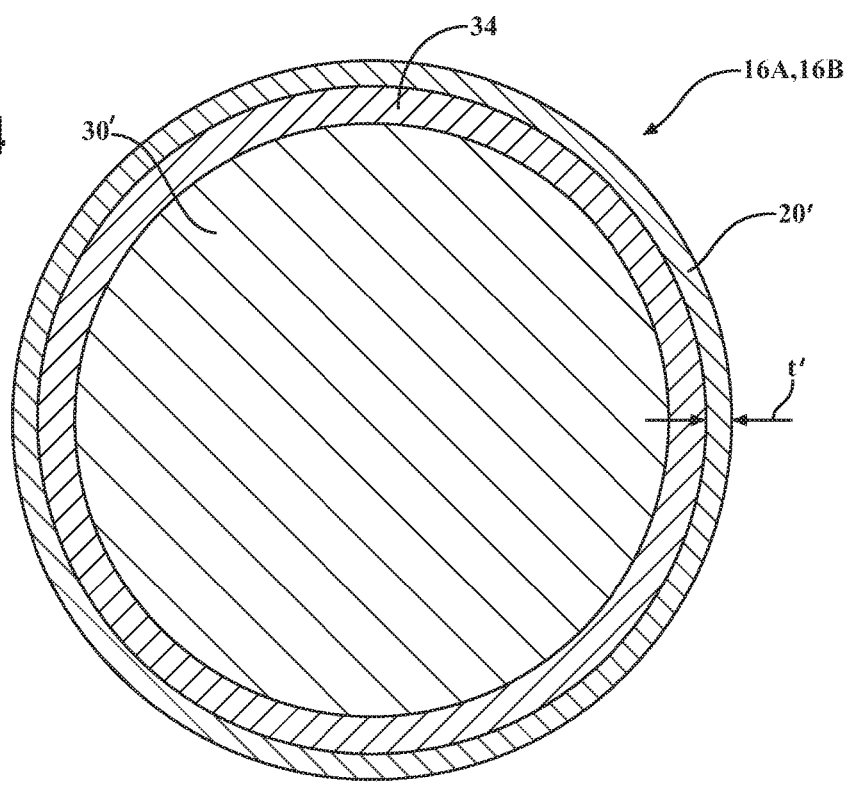
FIG. 4 is a sectional view of another variation of the sand core of the sand casting apparatus of FIG. 1, according to the principles of the present disclosure.

Referring now to FIG. 4, another variation of the outer layer is illustrated and generally designated at 20'. It should be understood that either outer layer 20, 20' could be used on the sand cores 16A, 16B. The outer layer 20' illustrated in FIG. 4 is formed by preparing a slurry to be applied to the sand casting base 30', where the sand casting base 30' is formed of the base sand mixture described above.

Similar to the powder material described above with respect to FIG. 3, the slurry used to form the outer layer 20' contains a powder material comprising silicon, magnesium, calcium, zirconium, manganese, carbon, aluminum, and iron. The slurry also contains a carrier mixture with accessory ingredients that typically either evaporate or become inert after the sand core 16A, 16B is cured. The accessory ingredients may include, for example, liquids and solids that facilitate suspension of the elemental components of the powder material portion of the slurry, such as alcohol, water, chemicals, and binder materials. The carrier mixture may be used to create a desired density and viscosity in the slurry. In some examples, the carrier mixture may be present in an amount of about 0.1 to about 10 weight percent of the slurry, with the powder material forming the balance of the slurry.

Similar to the powder material used in the outer layer 20 example of FIG. 3, the powder material that is mixed with the carrier mixture to form the outer layer 20' of FIG. 4 may contain about 50 to about 70 weight percent silicon; about 1.2 to about 4.5 weight percent magnesium; about 0.5 to about 1.0 weight percent calcium; about 0.5 to about 1.5 weight percent zirconium; about 0.5 to about 2.5 weight percent manganese; about 2.5 to about 5.0 weight percent carbon; about 0.5 to about 1.0 weight percent aluminum; and at least about 14.485 weight percent iron. In some forms, the powder material comprises about 14.485 to about 44.3 weight percent iron. Preferably, the powder material contains no more than 0.005 weight percent sulfur and no more than 0.01 weight percent phosphorus.

When the outer layer 20' is formed from the slurry, the outer layer 20' may preferably have a thickness t' in the range of about 0.3 to about 1.0 mm. The outer layer 20' may be applied to the sand casting base 30' after the sand casting base 30' is formed by hot or cold box core making. For example, the outer layer 20' may be formed on the sand casting base 30' by dipping or spraying the slurry onto the sand casting base 30'.

In some variations, a penetration layer 34 may be disposed between the sand casting base 30' and the outer layer 20'. The penetration layer 34 is formed, for example, of materials designed to prevent the molten cast iron of the component 22 from penetrating into the sand casting base 30' (i.e., into the core 16A, 16B or the mold half 12). Although only shown in FIG. 4 and not shown in FIG. 3, the sand casting base 30 and the outer layer 20 of FIG. 3 could also have a penetration layer disposed between the sand casting base 30 and the outer layer 20.

Elements contained in the outer layers 20, 20' of either variation are configured to react with the nodular cast iron of the automotive component 22, which was previously prevented, typically by barrier layers, within the art. By reacting the outer layers 20, 20' with the nodular cast iron of the component 22, magnesium and other elements are added to the surface of the component 22 to combat the ill effects of the sulfur originating from binders and/or curing gases of the sand casting apparatus 10. This provides for a nodular graphite structured surface to be produced on the skin of the component 22 that contains pearlite rather than a degenerated graphite surface having a ferritic matrix, a large amount of roughness, and that is vulnerable to cracking. The result of using one of the outer layers 20, 20' on the sand casting base 30, 30' results in local magnesium recovery in the range of about 0.03 to about 0.06 weight percent after the magnesium and sulfur reactions. Thus, the sulfur originating from the sand casting base 30, 30' is kept to a level below 0.02 weight percent.

In addition, the manganese in the outer layer 20, 20' provides for ferrite suppression, and calcium reacts with moisture to minimize magnesium loss. Further, adding carbon assists with preventing decarburization, and zirconium may be used to form a thermal barrier to slow down molten iron penetration into the sand casting base 30, 30' and to form a finer casting surface.

Thus, the surfaces 26 of the component 22 that are formed by the sand cores 16A, 16B, and specifically one of the outer layer portions 20, 20', has the desired smooth nodular surface.

Figure 5:
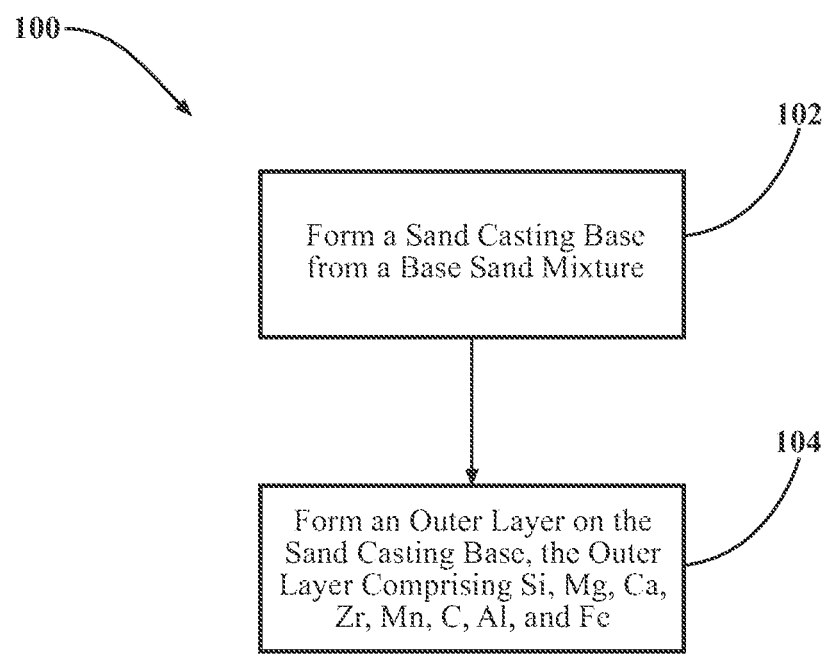
FIG. 5 is a block diagram generally illustrating a method of forming a sand casting apparatus, such as the sand core or the sand casting apparatus of FIGS. 1, 3, and 4, in accordance with the principles of the present disclosure.

Referring now to FIG. 5, a method of forming a sand casting apparatus, such as the sand casting apparatus 10 described above, is generally designated at 100. The method 100 begins with a step 102 of forming a sand casting base, such as a sand mold or a sand core, from a base sand mixture comprising a sand material and a binder material, such as the base sand mixture described above. The sand casting base may be a sand mold core 16A, 16B, as shown and described above, or it may be a sand mold, such as the sand mold half 12 described above.

The method 100 also includes a step 104 of forming an outer layer on the sand casting base. The outer layer may comprise silicon, magnesium, calcium, zirconium, manganese, carbon, aluminum, and iron, and may be configured to react with the metal of the component 22, as described above.

The outer layer 20, 20' may be provided as described above, as a mixture of a base sand mixture and the powder material as shown and described with respect to FIG. 3, or as a slurry formed of a carrier mixture and the powder material as shown and described with respect to FIG. 4, by way of example. In some forms, the method 100 may also include disposing a penetration layer 34 between the outer layer 20, 20' and the sand casting base 30, 30' (16A, 16B), if desired.

By way of example, if the outer layer 20 is formed of a mixture of the base sand mixture and the powder material, the outer layer 20 may be formed simultaneously with or after forming the sand casting base 30 (the core or the mold) by curing. If the outer layer 20' is formed as a slurry, it may be applied after the sand casting base 30' is cured, for example, by dipping, spraying, or in any other desired way.

The description is merely exemplary in nature and variations that do not depart from the gist of the disclosure are intended to be within the scope of the disclosure. Such variations are not to be regarded as a departure from the spirit and scope of the disclosure.

What is claimed is:

1. A sand casting apparatus comprising:
    a sand casting base comprising at least one of a sand mold and a sand core, the sand casting base comprising a base sand mixture, the base sand mixture comprising a sand material and a binder material; and
    an outer layer disposed on the sand casting base, the outer layer comprising silicon, magnesium, calcium, zirconium, manganese, carbon, aluminum, and iron.

2. The sand casting apparatus of claim 1, wherein the outer layer comprises the following:
    about 86 to about 96.5 weight percent of the base sand mixture; and
    about 3.5 to about 14 weight percent of a powder material, the powder material comprising:
        about 50 to about 70 weight percent silicon;
        about 1.2 to about 4.5 weight percent magnesium;
        about 0.5 to about 1.0 weight percent calcium;
        about 0.5 to about 1.5 weight percent zirconium;
        about 0.5 to about 2.5 weight percent manganese;
        about 2.5 to about 5.0 weight percent carbon;
        about 0.5 to about 1.0 weight percent aluminum; and
        at least about 14.485 weight percent iron.

3. The sand casting apparatus of claim 2, wherein the powder material comprises no more than 0.005 weight percent sulfur and no more than 0.01 weight percent phosphorus.

4. The sand casting apparatus of claim 3, wherein the powder material comprises about 14.485 to about 44.3 weight percent iron.

5. The sand casting apparatus of claim 4, wherein the outer layer is in the range of about 3 to about 10 mm thick.

6. The sand casting apparatus of claim 5, further comprising a penetration layer disposed between the outer layer and the sand casting base.

7. The sand casting apparatus of claim 1, wherein the outer layer is formed of a slurry comprising:

a carrier mixture; and a powder material, the powder material comprising:
about 50 to about 70 weight percent silicon;
about 1.2 to about 4.5 weight percent magnesium;
about 0.5 to about 1.0 weight percent calcium;
about 0.5 to about 1.5 weight percent zirconium;
about 0.5 to about 2.5 weight percent manganese;
about 2.5 to about 5.0 weight percent carbon;
about 0.5 to about 1.0 weight percent aluminum; and
at least about 14.485 weight percent iron.

8. The sand casting apparatus of claim 7, wherein the powder material comprises no more than 0.005 weight percent sulfur and no more than 0.01 weight percent phosphorus.

9. The sand casting apparatus of claim 8, wherein the powder material comprises about 14.485 to about 44.3 weight percent iron.

10. The sand casting apparatus of claim 9, wherein the outer layer is in the range of about 0.3 to about 1.0 mm thick.

11. The sand casting apparatus of claim 10, further comprising a penetration layer disposed between the outer layer and the sand casting base.

12. The sand casting apparatus of claim 1, wherein the sand casting base is a sand core, and the outer layer is disposed about the circumference of the sand core.

13. A method of forming a sand casting apparatus, the method comprising:
forming a sand casting base from a base sand mixture comprising a sand material and a binder material; and
forming an outer layer on the sand casting base, the outer layer comprising silicon, magnesium, calcium, zirconium, manganese, carbon, aluminum, and iron.

14. The method of claim 13, further comprising forming the outer layer with the following:
about 86 to about 96.5 weight percent of the base sand mixture comprising the sand material and the binder material; and
about 3.5 to about 14 weight percent of a powder material, the powder material comprising:
about 50 to about 70 weight percent silicon;
about 1.2 to about 4.5 weight percent magnesium;
about 0.5 to about 1.0 weight percent calcium;
about 0.5 to about 1.5 weight percent zirconium;
about 0.5 to about 2.5 weight percent manganese;
about 2.5 to about 5.0 weight percent carbon;
about 0.5 to about 1.0 weight percent aluminum; and
at least about 14.485 weight percent iron.

15. The method of claim 13, further comprising forming the outer layer from of a slurry comprising:
a carrier mixture; and
a powder material, the powder material comprising:
about 50 to about 70 weight percent silicon;
about 1.2 to about 4.5 weight percent magnesium;
about 0.5 to about 1.0 weight percent calcium;
about 0.5 to about 1.5 weight percent zirconium;
about 0.5 to about 2.5 weight percent manganese;
about 2.5 to about 5.0 weight percent carbon;
about 0.5 to about 1.0 weight percent aluminum; and
at least about 14.485 weight percent iron.

* * * * *